United States Patent [19]
Grix

[11] 3,971,596
[45] July 27, 1976

[54] ELECTRO-PNEUMATIC AIR BRAKE VALVE AND SYSTEM COMPATIBLE WITH A SKID CONTROL SYSTEM
[75] Inventor: Arthur R. Grix, St. Louis, Mo.
[73] Assignee: Wagner Electric Corporation, Parsippany, N.J.
[22] Filed: June 27, 1975
[21] Appl. No.: 591,148

Related U.S. Application Data
[62] Division of Ser. No. 536,596, Dec. 26, 1974.

[52] U.S. Cl. .................................. 303/40; 303/47
[51] Int. Cl.² ........................................ B60T 13/68
[58] Field of Search ................ 303/7, 40, 47, 59, 69

[56] References Cited
UNITED STATES PATENTS
| 2,985,488 | 5/1961 | Stelzer | 303/47 X |
| 3,796,468 | 3/1974 | Morse et al. | 303/40 X |
| 3,881,779 | 5/1975 | Machek | 303/40 X |

Primary Examiner—Duane A. Reger
Attorney, Agent, or Firm—James R. Bell

[57] ABSTRACT
A vehicle brake actuation system is disclosed containing fluid pressure to operate brake actuators for effectively combining an electro-pneumatic relay system to function with a skid control system. A first valve is connected in the system for releasing a first impulse of fluid pressure from a first container. A second valve is connected to receive the first impulse from the first container, a second pressure impulse from a second container and to release a third pressure impulse from the second container to the actuators. A first sensor senses fluid pressure between the first and second valves and produces a first signal in proportion thereto. A second sensor senses fluid pressure between the second valve and the actuators and produces a second signal in proportion thereto. A first logic circuit receives and compares the first and second signals for discriminately controlling communication of the first, second and third impulses with the second valve. A second or skid control logic circuit is operable to override the first logic circuit to discriminately interrupt communication of the first impulse with the second valve. The second valve has a first port for receiving the first impulse. A second port is connected to receive the second impulse. A first solenoid in the first port is normally open and is operable to close for interrupting the first impulse. A second solenoid is in the second port and is normally closed and operable to open for admitting the second impulse to the valve.

5 Claims, 6 Drawing Figures

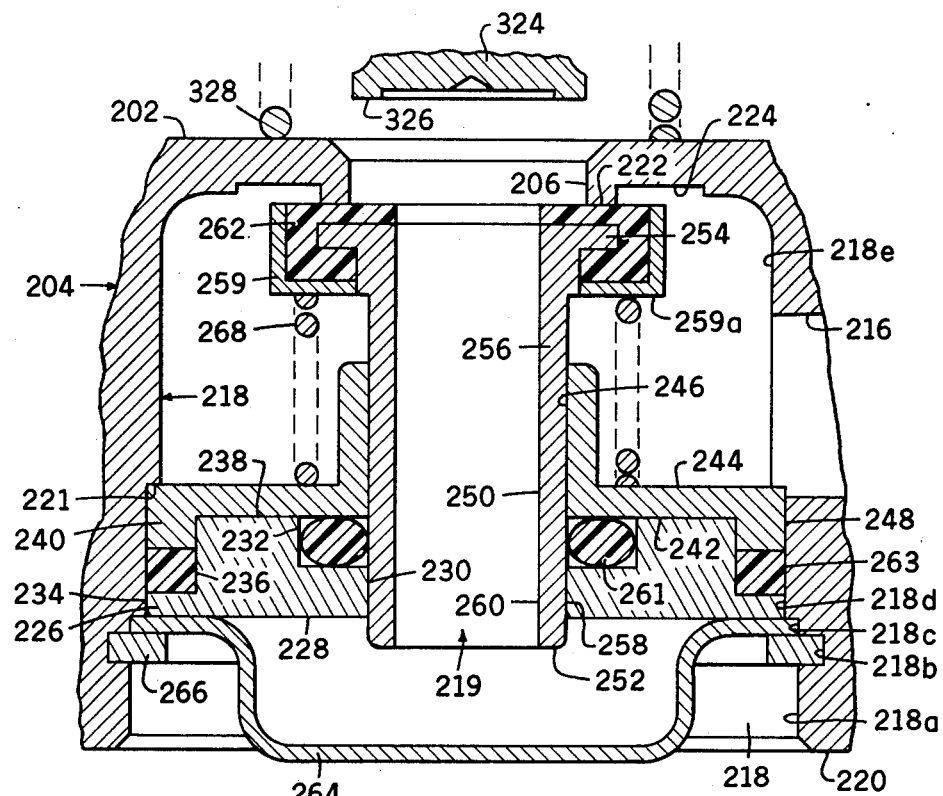

3,971,596

ELECTRO-PNEUMATIC AIR BRAKE VALVE AND SYSTEM COMPATIBLE WITH A SKID CONTROL SYSTEM

This is a division of application Ser. No. 536,596, filed Dec. 26, 1974.

BACKGROUND OF THE INVENTION

1. Field of the Invention

This invention relates generally to fluid pressure brake systems and particularly to automatic application valves as used in such systems.

2. Description Of The Prior Art

In air brake systems, especially in tractor-trailer combinations, a problem exists in that air pressure applied at the tractor portion must actuate the trailer brakes which are physically located substantial distances from the tractor. As a result, time delays exist between the air brake application at the tractor and air brake actuation at the trailer. To reduce such time delays, valves and systems were devised whereby an air supply was provided in proximity to the trailer brakes and a relay valve was provided adjacent that air supply. In addition, since an electrical impulse can move between two points faster than an impulse moved by air pressure, electrical means were provided to actuate the relay valve for releasing air pressure to actuate the trailer brakes inasmuch as electrical signals could actuate the trailer brakes almost simultaneously with application of the brakes at the tractor thus avoiding the previously known time delays. Such systems are of the type shown and described in U.S. Pat. Nos. 3,747,992 and 3,796,468. Unfortunately, the systems of the prior art are not compatible with skid control systems unless a novel relay valve is provided in the system.

SUMMARY OF THE INVENTION

Accordingly, the present invention provides a system and a valve for use therein to make that system compatible with skid control systems in tractor-trailer combinations. The foregoing is accomplished by providing a vehicle brake actuation system for containing fluid pressure to operate brake actuators for effectively combining an electro-pneumatic relay system to function with a skid control system. Specifically, a first valve is connected in the system for releasing a first impulse of fluid pressure from a first container. A second valve receives the first impulse from the first container, a second pressure impulse from a second container and releases a third pressure impulse from the second container to some of the actuators. A first sensor senses the fluid pressure between the first and second valves and produces a first signal in proportion thereto. A second sensor senses fluid pressure between the second valve and the actuators and produces a second signal in proportion thereto. A first logic circuit receives and compares the first and second signals for discriminately controlling communication of the first, second and third impulses with the second valve. A second or skid control logic circuit is operable to override the first logic circuit to discriminately interrupt communication of the first impulse with the second valve. The second valve has a first port for receiving the first impulse. A second port is connected to receive the second impulse. A first solenoid in the first port is normally open and is operable to close for interrupting the first impulse as upon command from either the first logic circuit or from the skid control logic circuit. A second solenoid is in the second port and is normally closed and operable to open for admitting the second impulse to the valve upon command from the first logic circuit.

Other advantages and novel features of the invention will become apparent from the following detailed description of the invention when considered in conjunction with the accompanying drawings.

BRIEF DESCRIPTION OF THE DRAWINGS

In the drawings wherein like parts are marked alike:

FIG. 2a is an exploded partial side elevation of the lower housing of FIG. 2;

FIG. 5 is a graphical illustration of the deadband effect included in this invention.

DESCRIPTION OF THE PREFERRED EMBODIMENT

Figure 1:
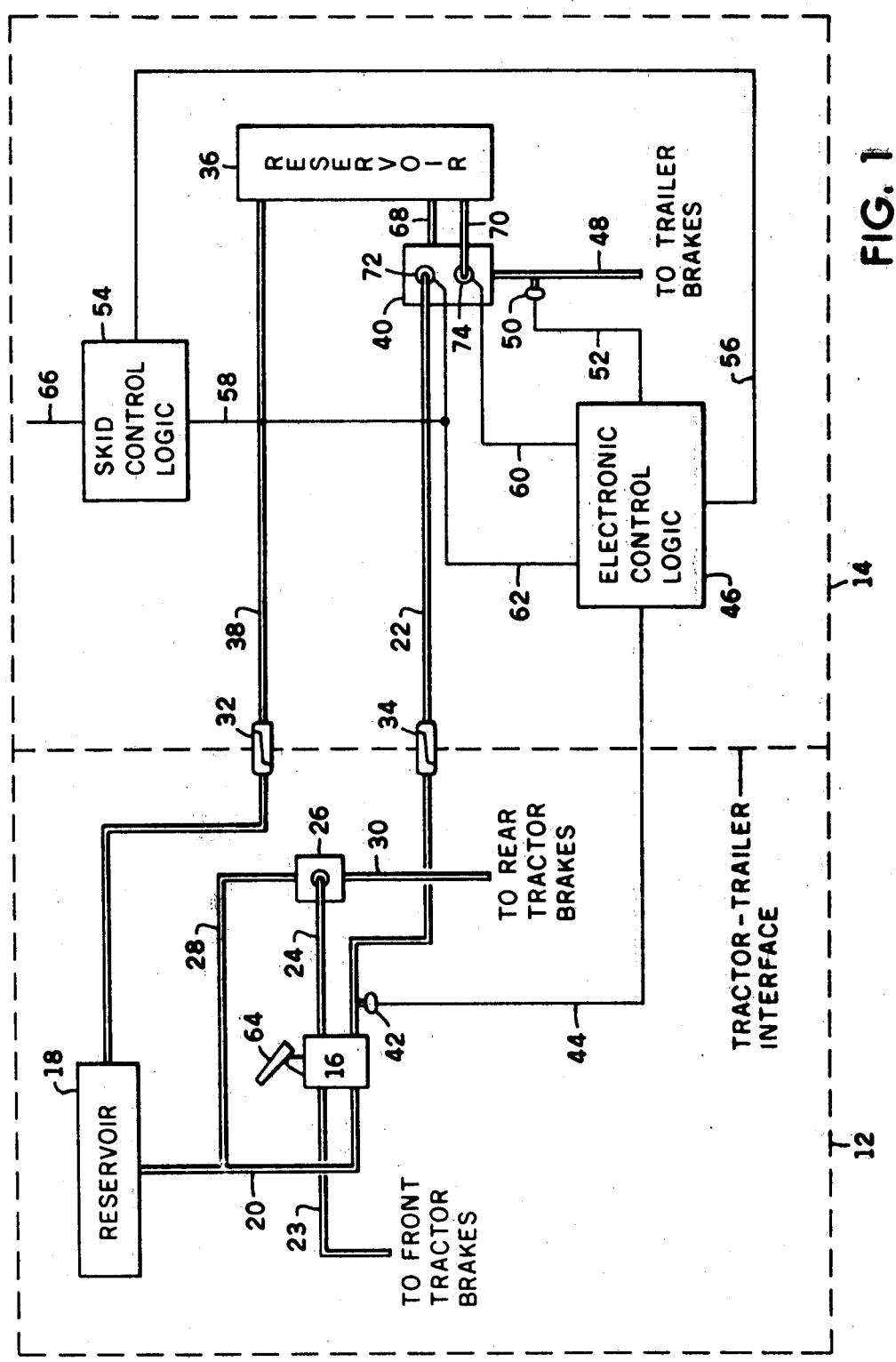
FIG. 1 is a diagrammatic illustration of the system of this invention.

FIG. 1 illustrates an electro-pneumatic air brake system generally designated 10 which comprises a first portion 12 mounted on the tractor of a tractor-trailer combination and a second portion 14 mounted on the trailer. Electro-pneumatic air brake systems are well known and generally include various interconnected electrical and fluid operated components including contained sources of fluid, such as air, under pressure.

Tractor portion 12 includes first or application valve 16 having a foot pedal 64 to be actuated or depressed by the vehicle operator. Air is contained under pressure in first reservoir 18. Conduit 20 interconnects reservoir 18 and valve 16. Also, conduit 28 interconnects reservoir 18 and tractor relay valve 26. Conduit 24 guides control air to relay valve 26 to actuate valve 26 to apply air to the rear tractor brakes and conduit 30 guides air from relay valve 26 to the rear tractor brakes as shown in the drawing. Conduit 23 delivers air from relay valve 26 to the front tractor brakes. Conduit 38 interconnects first reservoir 18 with second or trailer reservoir 36 so that the tractor and trailer fluid pressure systems can reach an equilibrium pressure. Conduit 22 interconnects first or application valve 16 with first port 72 of second or trailer relay valve 40. First transducer 42 is provided along conduit 22 adjacent valve 16 to sense pressure in that conduit and convert the pressure sensed into an electrical signal for sending that signal along electrical connector 44 to first logic means or electronic control 46 of trailer portion 14. Air conduits 22, 38 are continued at the tractor-trailer interface by well known gladhands connectors 34, 32, respectively.

Trailer portion 14 includes relay valve 40. In addition to air supplied to first port 72 of relay valve 40 from first reservoir 18 of tractor portion 12, second reservoir 36 supplies air to second port 74 of relay valve 40 via conduit 70. Also, air may be supplied from reservoir 36 to another portion of relay valve 40 via conduit 68 and ultimately to some of the brake actuators such as the rear trailer brakes via conduit 48. First logic means 46 is electrically connected to a first solenoid adjacent first port 72 of relay valve 40 via electrical connector 62 and to a second solenoid adjacent second port 74 of relay valve 40 via electrical connector 60. Second transducer 50 is provided along conduit 48 adjacent valve 40 to sense pressure in the conduit and convert the pressure sensed into an electrical signal for sending that signal to first logic means 46 via electrical connector 52. Second or skid control logic means 54, well known, receives input sensor signals from the vehicle wheels via electrical connector 66 to determine impending skid conditions. A skid control output logic signal is sent to first logic means 46 via electrical connector 56 and to the electrical connector 62 leading to the first solenoid via electrical connector 58.

Figure 2:
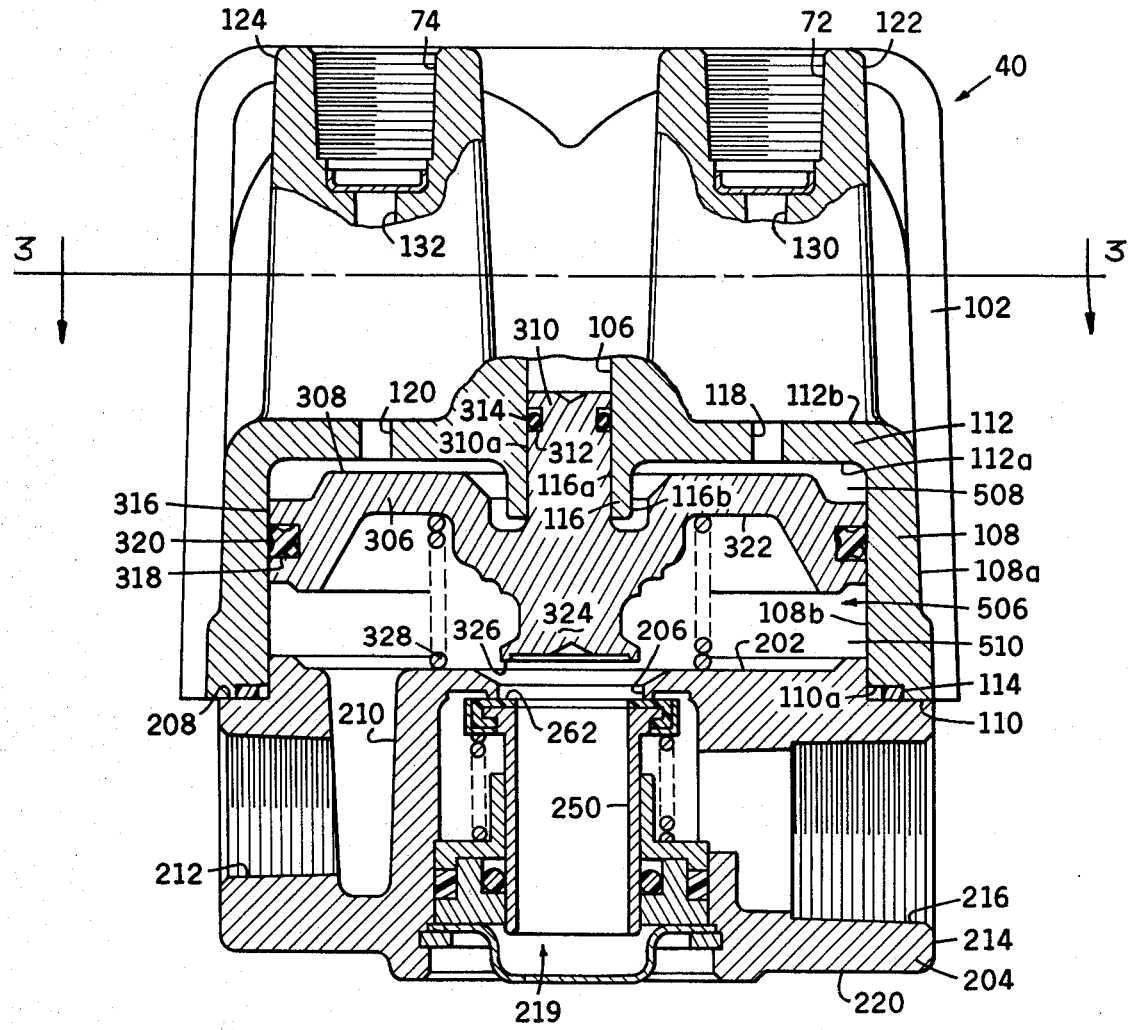
FIG. 2 is a partially cutaway side elevation of the novel relay valve of this invention.

FIG. 2 generally illustrates relay valve 40 having an upper housing portion 102 and a lower housing portion 204. Each housing portion is preferably formed by casting a suitable metal for finishing as by machining or the like, although other suitable casting or molding materials are contemplated.

Upper housing portion 102 includes generally annular portion 108 having an outer annular peripheral surface 108a and an inner annular bore 108b extending inwardly from first annular end 110 and terminating at inner surface 112a of annular endwall 112. First end 110 includes groove 110a for accommodating sealing O-ring 114. Outer surface 108a extends upwardly from end 110 and terminates at and extends into outer surface 112b of endwall 112. Annular bore 106 is centrally located in endwall 112 and includes annular lip 116 having inner and outer annular surfaces 116a and 116b respectively. Vertical passageways 118 and 120 are formed in endwall 112 and extend therethrough from inner surface 112a continuing upwardly into extended portions 122, 124 respectively integratedly formed with upper portion 102.

Figure 3:
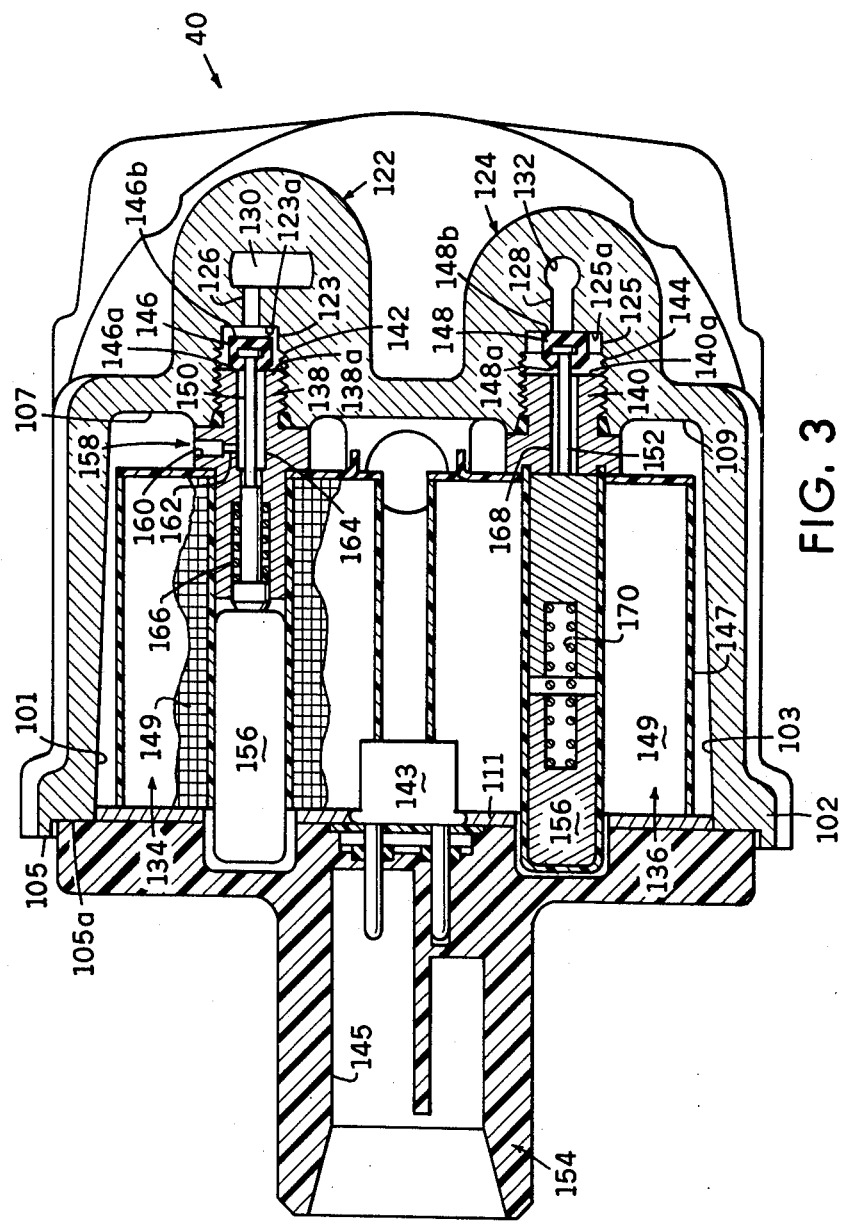
FIG. 3 is a cutaway plan view of the novel relay valve of this invention taken along line 3—3 of FIG. 2.

In FIG. 3, passageways 118, 120 terminate at openings 123, 125, respectively. Transverse or horizontal passageways 126, 128, respectively interconnect openings 123, 125 with vertical passageways 130, 132 which, as shown in FIG. 2, terminate in enlarged openings or ports 72, 74, respectively, adapted for being threadedly secured to appropriate high pressure fluid connectors to respectively accommodate fluid conduits 22 and 70.

Returning to FIG. 3, well known solenoids 134, 136 of the type generally shown and described in U.S. application Ser. No. 369,966 filed June 14, 1973 now U.S. Pat. No. 3,854,501, entitled "Antilock Brake System And Control Valve Therefor" issued on Dec. 17, 1974 to John A. Machek and assigned to the assignee of this invention, are mounted in side by side annular openings 101, 103, respectively, formed in upper portion 102 and having centroidal axes transverse to the centroidal axis of annular bore 106. Openings 101, 103 extend inwardly from first end 105 and terminate at endwalls 107, 109, respectively. Threaded recesses 142, 144 are formed in endwalls 107, 109, respectively. Threaded mounting portions 138, 140 of solenoids 134, 136, respectively, are secured into correspondingly threaded recesses 142, 144. Threaded recesses 142, 144 are integratedly formed with openings 123, 125 respectively for accommodating plunger sealing portions 146, 148 of solenoids 134, 136, respectively. Electrical connector 143 is appropriately mounted in housing portion 102 for interconnecting electrical power supplied to receptacle 145 with the conductive portions or coils 149 which surround axially reciprocable armatures 156 of the well known solenoids via conductive flux plate 111. Coils 149 are insulatedly mounted in housing portion 102 by appropriate nonconductive insulators 147 in the well known manner. Also, plunger shaft portions 150, 152 of solenoids 134, 136, respectively are provided to interconnect armatures 156 with sealing portions 146, 148 for sealing engagement with seating areas or lands 123a, 125a, respectively, formed at the intersecting portions of openings 123, 125 and horizontal passageways 126, 128, respectively. Exhaust passage 158 is formed in first extended portion 122 and includes relatively large passage portion 160 integratedly and coaxially formed with relatively small passage portion 162 so that exhaust passage 158 interconnects plunger passage 164 with annular opening 101. In this manner, first sealing surface 146a of solenoid sealing portion 146 may seat against land 138a formed on threaded mounting portion 138 of first solenoid 134 to interrupt fluid communication between plunger passageway 164 and opening 123 when in a first, or non-actuated position, or in the alternative, second sealing surface 146b of solenoid sealing portion 146 may seat against land 123a to interrupt fluid communication between horizontal passageway 126 and opening 123 when in a second or actuated position. Thus, plunger shaft 150 is normally biased by spring 166 so that second sealing surface 146b is normally out of sealing engagement with land 123a and fluid communication between passage 126 and opening 123 is normally open. Plunger 152 extends through plunger passage 168 of threaded mounting portion 140 of second solenoid 136 mounted in annular opening 103. Sealing portion 148 is mounted on plunger shaft 152 and includes first sealing surface 148a for sealing engagement with seating area 125a to limit fluid communication between horizontal passageway 128 and opening 125 when in a first or non-actuated position, or in the alternative, second sealing surface 148b or solenoid sealing portion 148 may seat against land 140a of threaded mounting portion 140 to open fluid communication between horizontal passageway 128 and opening 125 when in a second or actuated position. Thus plunger shaft 152 is normally biased by spring 170 so that first sealing surface 148a is normally in sealing engagement with seating area or land 125a and fluid communication between passages 128 and opening 125 is normally closed. Nonconductive closure member 154 including receptacle 145 seats in recess 105a formed in end 105 of upper portion 102 to position flux plate 111 in recess 105a against displacement, the closure member being secured to the housing by some suitable means.

Lower housing 204, FIG. 2, is generally annular and includes upper surface 202 including a centrally located aperture 206 therein for coaxial disposition with bore 106 of upper housing 102. Recess 208 is formed at the intersection of outer annular periphery 214 and surface 202 for accommodating lower annular end 110 of upper housing 102. Also, recess 210 is formed in upper surface 202 and extends downwardly into housing 204. Threaded outlet or port 212 is formed in outer periphery 214 for accommodating an appropriate fixture for conducting fluid under pressure from relay valve 40 to the vehicle brakes via conduit 48. Outlet 212 extends inwardly into lower housing 204 and intersects recess 210. Threaded inlet or port 216 is formed in outer periphery 214 for accommodating an appropriate fixture for conducting fluid under pressure from fluid pressure source 36 to relay valve 40 via conduit 68.

Stepped annular bore 218, FIG. 2a, is formed in lower housing 204 and extends from lower surface 220 toward its intersection with aperture 206 in upper surface 202 to accommodate exhaust port or passageway 219 through lower housing 204 coincidental with the centroidal axis thereof. Bore 218 includes first portion 218a intersecting with lower surface 220 and extending inwardly to intersect with snap ring groove 218b. Retainer groove 218c of bore 218 is adjacent snap ring groove 218b and second portion 218d extends inwardly from retainer groove 218c to its intersection with third bore portion 218e forming shoulder 221. Annular seating portion 222 is formed at the on shoulder 224 intermediate of bore portion 218e and aperture 206. First annular insert 226 is preferably of metal and includes retaining surface 228, inner annular surface 230 including inner groove 232, outer annular surface 234 including outer groove 236, and upper surface 238 axially opposite retaining surface 228 and interposed between inner and outer grooves 232, 236. Second annular insert 240 is preferably of metal and includes lower surface 242 and axially opposed upper land or surface 244, inner annular surface 246 and outer annular surface 248. Annular piston or plunger 250 is preferably of metal and is generally tubular including lower end 252 and upper flanged end 254. Intermediate tubular or cylindrical portion 256 interconnects upper and lower ends 254, 252, respectively and includes outer periphery 258 and inner periphery 260. Upper flanged end 254 includes resilient seal member 262 held in place by metal retainer 259 forming a lower spring seating surface 259a of flanged end 254. Piston 250 may be inserted into bore 218 so that seal member 262 engages annular seating portion 222. Second insert 240 is placed in bore 218 so that inner annular surface 246 engages outer periphery 258 of piston 250 and outer annular surface 248 engages bore portion 218d. Second insert 240 is axially retained by shoulder 221 intermediate of bore portions 218d and 218e. First insert 226 is placed in bore 218 so that upper surface 238 engages lower surface 242 of second insert 240, outer periphery 234 engages bore portion 218d and inner periphery 230 engages outer periphery 258 of piston 250. Resilient sealing O-rings 261, 263 are placed in inner and outer annular grooves 232, 236, respectively. Retainer 264 is snapped into retainer groove 218c to abut retainer surface 228 of first insert 226 and snap ring 266 is snapped into snap ring groove 218b to abut and secure retainer 264 in place. Spring 268 is disposed between spring seating surface 259a and upper land 244 to normally urge sealing member 262 into sealing engagement with annular seating portion 222.

Annular piston 306 is preferably of metal and includes upper surface 308 including extended portion 310 centrally located and provided to slidably engage inner surface 116a of upper housing 102. O-ring groove 312 is provided in annular periphery 310a for accommodating resilient O-ring 314 in sealing and sliding engagement with surface 116a. Outer annular peripheral surface 316 of piston 306 includes O-ring groove 318 for accommodating resilient O-ring 320 in sealing and sliding engagement with inner surface 108b of upper housing portion 102. Lower surface 322 of piston 306 includes extended portion 324 axially opposed to extended portion 310. Extended portion 324 terminates at annular seat 326 engageable with sealing portion 262 of piston 250. Compression spring 328 is disposed between surface 322 of piston 306 and upper surface 202 of lower housing 204 for urging piston 306 upwardly away from lower housing 204 and toward housing 102 so that annular seat 326 does not normally engage seal 262 of piston 250.

Main piston chamber 506 is formed by inner surface 112a of upper housing 102, upper surface 202 of lower housing 204 and inner annular bore 108b of upper housing 102. Piston 306 sealingly slidably engages inner annular bore 108b via sealing ring 320 to separate main chamber 506 into upper chamber portion 508 and lower chamber portion 510. The upper chamber is formed by inner surface 112a, upper surface 308 of piston 306 and inner annular bore 108b. The lower chamber is formed by lower surface 322 of piston 306, upper surface 202 and inner annular bore 108b.

Figure 4:
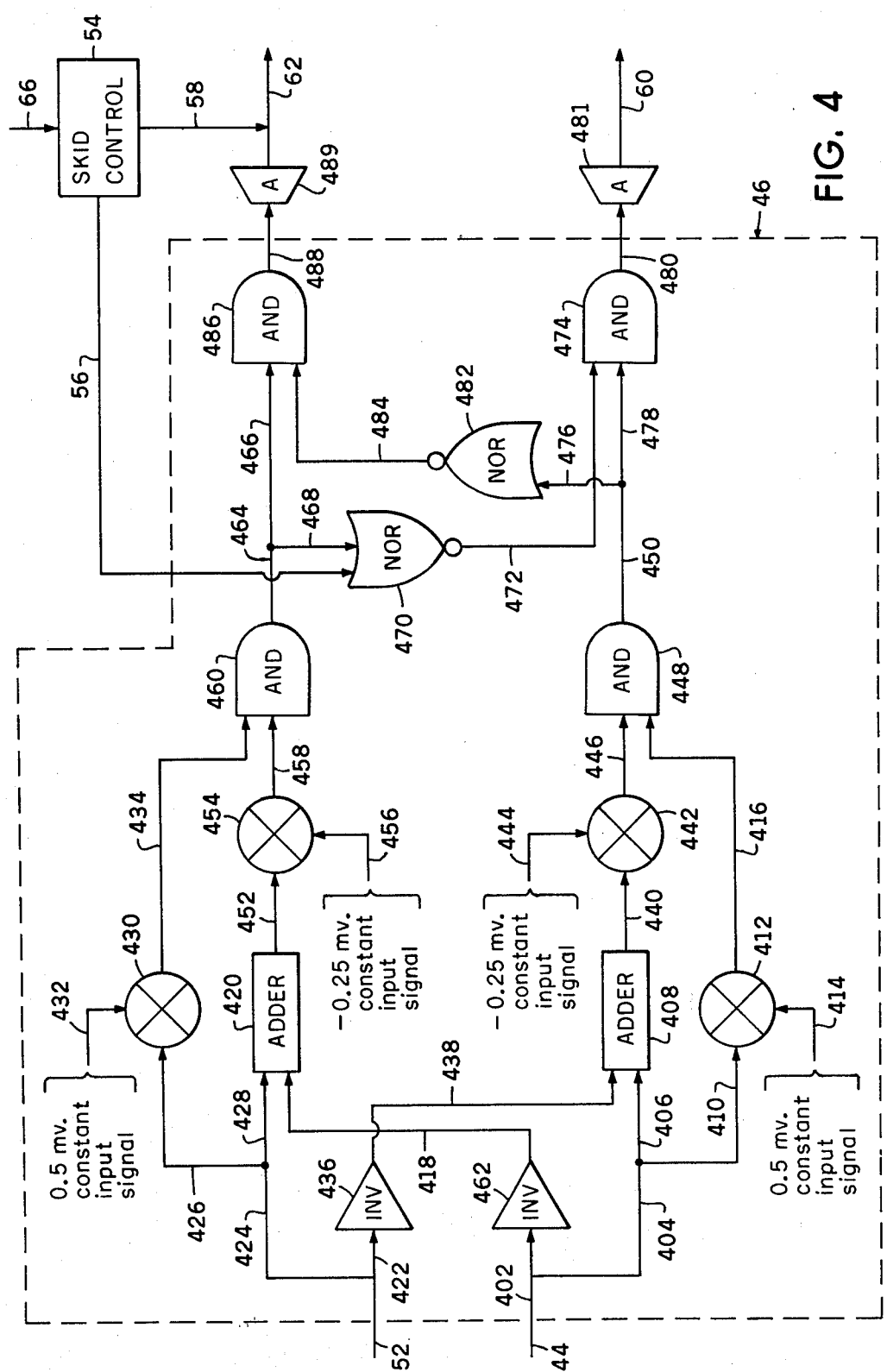
FIG. 4 is a diagrammatic illustration of the first logic circuit of this invention.

FIG. 4 includes the logic circuitry of first logic means 46 which is the electronic control connected to receive first and second signals from first and second transducers 42, 50, respectively. Inasmuch as first sensor or transducer 42 senses fluid pressure in conduit 22 and produces a first signal proportional thereto and inasmuch as second sensor or transducer 50 senses fluid pressure in conduit 48 and produces a second signal proportional thereto, the first logic means 46 is capable of discriminately controlling communication of a second pressure impulse to the trailer brakes (not shown) dependent upon impulse communication of a first pressure from first valve 16 to second valve 40. It can be seen from the logic system of FIG. 4 that for example where the system pressure is within a range of 0–100 pounds per square inch (psi) the transducers 42, 50 may produce a proportional signal within the ringe of 0–10 millivolts (mv). Thus, in the application mode, for example, wherein a pressure of 50 psi is produced at application valve 16 and into conduit 22, a proportional signal of 5 mv will be sent from transducer 42 to logic means 46 via connection 44. This signal enters the logic means at line 44 and is sent to inverter 462 via line 402 and also sent to adder 408 via lines 404, 406 and to comparator 412 via lines 404, 410. Thus, inverter 462, adder 408 and comparator 412 each receive a 5 mv signal from transducer 42. The 5 mv signal received by inverter 462 is inverted to a minus (−) 5 mv signal and sent to adder 420 via line 418. At this point there is no significant pressure sensed at transducer 50 so that a zero (0) mv signal is realized by logic means 46 relative to transducer 50. This 0 mv signal enters the logic means at line 52 and is sent to inverter 436 via line 422 and also sent to adder 420 via lines 424, 428 and to comparator 430 via lines 424, 426. Thus, inverter 436, adder 420 and comparator 430 each received a 0 mv signal from transducer 50. The 0 mv signal received by inverter 436 is inverted to a minus (−) 0 mv signal and sent to adder 408 via line 438.

At this point adder 408 is receiving a 5 mv input signal from transducer 42 and a −0 mv input signal from transducer 50 via inverter 436. The adder, as is well known, will algebraically add the values of these inputs and produce a resultant output signal which, in this case, is a 5 mv signal which is sent to comparator 442 via line 440. Similarly, adder 420 is receiving a −5 mv input signal from transducer 42 via inverter 462 and a 0 mv input signal from transducer 50. Adder 420, as is well known, all algebraically add the values of these inputs and produce a resultant output signal which, in this case, is a −5 mv signal which is sent to comparator 454 via line 452.

Comparators, as it is well known, can receive various signals and compare them to produce either a signal of some value (e.g. 1) or no signal (e.g. 0). Comparator 412 is provided to receive a predetermined signal from an external power source, e.g. a predetermined signal of 0.5 mv to simulate a pressure sensed of 5 psi. Comparator 442 is provided to receive a predetermined signal from an external power source, e.g. a predetermined signal of −0.25 mv to simulate a pressure sensed of −2.5 psi. Similarly, comparators 432 and 454 are receiving signals of 0.5 mv and −0.25 mv, respectively. Thus, comparator 412 is receiving signals of 5 mv and 0.5 mv, comparator 442 is receiving signals of 5 mv and −0.25 mv, comparator 430 is receiving signals of 0.5 mv and 0 mv and comparator 454 is receiving signals of −5 mv and −0.25 mv. In logic means 46, comparator 412 is provided to produce a signal of value (e.g. a 1 signal) if the value of the signal it receives via line 410 is greater than the value of the signal it receives via line 414, and to produce no signal (e.g. a 0 signal) if the value of the signal it receives via line 414 is greater than the value of the signal it receives from line 410. In this case, comparator 412 receives the signal of greater value from line 410 and thus produces a 1 signal communicated to "and" gate 448 via line 416. Comparator 442 is provided to produce a 1 signal if the value of the signal it receives via line 440 is greater than the value of the signal it receives via line 444, and to produce a 0 signal if the value of the signal it receives via line 444 is greater than the value of the signal it receives from line 440. In this case comparator 442 receives the signal of greater value from line 440 and thus produces a 1 signal communicated to and gate 448 via line 446. Comparator 430 is provided to produce a 1 signal if the value of the signal it receives via line 426 is greater than the value of the signal it receives via line 432 and to produce a 0 signal if the value of the signal it receives via line 432 is greater than the value of the signal it receives via line 426. In this case comparator 430 receives the signal of greater value from line 432 and thus produces a 0 signal communicated to and gate 460 via line 434. Comparator 454 is provided to produce a 1 signal if the value of the signal it receives via line 452 is greater than the value of the signal it receives via line 456 and to produce a 0 signal if the value of the signal it receives via line 456 is greater than the value of the signal it receives from line 452. In this case comparator 454 receives the signal of greater value from line 456 and thus produces a 0 signal communicated to and gate 460 via line 458.

And gates, as it is well known, can receive both a 1 signal and a 0 signal to produce either a resultant 1 signal or 0 signal. And gates 448, 460 are provided to produce a 1 signal when each signal it receives is a 1 signal and to produce a 0 signal when any signal it receives is a 0 signal. At this point and gate 448 is receiving a 1 signal from comparator 442 and a 1 signal from comparator 412. Thus, gate 448 produces a 1 signal. And gate 460 is receiving a 0 signal from comparators 430, 454. Thus, gate 460 produces a 0 signal.

"Nor" gates, as it is well known, can receive a 0 signal and change it to a 1 signal, and in the alternative can receive a 1 signal and change it to a 0 signal. The 1 signal produced at and gate 448 is sent to and gate 474 via line 450, 478 and to nor gate 482 via lines 450, 476. Nor gate 482 converts the 1 signal received from and gate 448 to a 0 signal which is sent to and gate 486 via line 484. The 0 signal produced at and gate 460 is sent to and gate 486 via lines 464, 466 and to nor gate 470 via lines 464, 468. Nor gate 470 converts the 0 signal received from and gate 460 to a 1 signal which is sent to and gate 474 via line 472. Thus and gate 474 receives a 1 signal from and gate 448 and a 1 signal from nor gate 470, whereas and gate 486 receives a 0 signal from and gate 460 and a 0 signal from nor gate 482. As previously stated, the and gates produce a 1 signal if they receive only 1 signals and produce a 0 signal if they receive any 0 signal. Thus, it can be seen that and gate 474 will produce a 1 signal along line 480, and and gate 486 will produce a 0 signal along line 488. Any signal from and gate 474 is sent along line 480 to a power amplifier 481 and then is transmitted along line 60 to second solenoid 136 which is normally closed. Any signal from and gate 486 is sent along line 488 to a power amplifier 489 and then is transmitted along line 62 to first solenoid 134 which is normally open.

Still referring to FIG. 4, the above-described logic means 46 being similar to those well known in tractor-trailer fluid pressure relay systems, a novel dimension is contemplated by this invention due to the coupling of the first logic means 46 with a known skid control logic means 54 via line 56 so that tractor-trailer fluid pressure relay systems may be adapted to meet skid control requirements. Skid control logic means 54 may be of the type shown and described in U.S. Pat. No. 3,827,760 to Joseph E. Fleagle, issued on Aug. 6, 1974 on application Ser. No. 218,378 filed Jan. 17, 1972 and entitled "Wheel Slip Control System For Automotive Vehicles And The Like"; U.S. Pat. No. 3,842,355 to Joseph E. Fleagle, issued on Oct. 15, 1974 on application Ser. No. 340,735 filed Mar. 13, 1973 and entitled "Signal Processing Circuit For Wheel Slip Control Systems", a division of the above-mentioned U.S. Pat. No. 3,827,760; U.S. Pat. No. 3,833,268 to Joseph E. Fleagle, issued on Sept. 3, 1974 on application Ser. No. 223,579 filed Mar. 10, 1972 and entitled "Wheel Slip Control System For Automotive Vehicles And The Like"; and U.S. Pat. No. 3,840,816 to Joseph E. Fleagle issued on Oct. 8, 1974 on application Ser. No. 340,915 filed Mar. 13, 1973 and entitled "Wheel Speed Signal Processing Circuit For Wheel Slip Control Systems", a division of the above-mentioned U.S. Pat. No. 3,833,268; each of the above-mentioned patents being assigned to the Assignee of the present invention and incorporated herein by reference. Also, line 54 interconnects skid control logic 54 and line 62 for direct electrical communication between the skid control logic and normally open solenoid 134. Thus, from the foregoing it can be seen that when impending skid conditions are sensed and transmitted to skid control logic means 54 via line 66, that logic means can send a signal to nor gate 470 of first logic means 46 and directly to first solenoid 134 via line 62. In addition to the aforementioned capability of nor gates, such gates can receive more than a single signal. When nor gates do receive plural signals and those signals are only 0 signals, the gate will produce a 1 signal; and when any signal received is a 1 signal a 0 signal will be produced. Of course, any signal or the absence thereof transmitted from skid control logic 54 directly to line 62 via line 54 is unaltered.

A "deadband" portion is included in first logic means 46 and is graphically illustrated in FIG. 5. The purpose of the deadband is to preclude simultaneous actuation of both solenoids 134, 136 within a predetermined band width. Without such a deadband it would be possible for both solenoids to be simultaneously actuated in which case the air supply from reservoirs 18, 36 would be rapidly depleted. Such simultaneous actuation of both solenoids could conceivably occur when transducers 42, 50 sensed equivalent pressures and sent identical signals to logic means 46. The deadband may be of a predetermined width such as for example 5 psi representing a 5 mv signal (i.e. from minus 2.5 psi to plus 2.5 psi) as shown in FIG. 5. Thus, the deadband precludes simultaneous actuation of both solenoids not where pressures sensed at both transducers are equivalent but when those pressures are within a predetermined pressure differential band width of, as in this case, 5 psi.

In FIG. 4, it can be seen that the deadband is provided in logic means 46 due to the inclusion of a constant signal input of minus (−) 0.25 mv to simulate a pressure of minus (−) 2.5 psi at comparator 454 and a similar input signal at comparator 442, and further due to the inclusion of nor gates 470 and 482. The deadband can be widened or narrowed by appropriately changing the values of the constant input signals at comparators 454, 442. Thus, the values of the constant input signals determine the width of the band whereas the inclusion of nor gate 470 between and gates 460, 474, and the inclusion of nor gate 482 between and gates 448, 486 preclude simultaneously actuated signals from reaching solenoids 136, 134, respectively.

The foregoing is illustrated in FIG. 5 where it is shown by the line designated B, the inverse of which is shown by the line designated C for descriptive purposes, that where the pressure sensed at transducer 50 is greater than that sensed at transducer 42, as the pressure differential decreases, the possibility of both solenoids 134, 136 simultaneously actuating is precluded within a predetermined deadband of 5 psi (i.e. minus 2.5 to plus 2.5). Similarly, as is shown by the line designated A, that where the pressure sensed at transducer 42 is greater than that sensed at transducer 50, as the pressure differential decreases, the possibility of both solenoids 134, 136 simultaneously actuating is precluded within the predetermined deadband.

Operation

During the application mode, that is, when the vehicle operator applies foot pressure to pedal 64, fluid pressure is released from first reservoir 18 through application valve 16 to the front tractor brakes via conduit 23, to the rear tractor brakes via conduit 30 and to relay valve 40 via conduit 22. Thus a first impulse of fluid pressure is produced at first valve 16 and communicated toward second valve 40 via conduit 22. The first inpulse may enter valve 40 at port 72 and pass through a first passageway comprising passages 130, 126 into opening 123 and further through passage 118 to upper chamber 508 to communicate with and cause a first downward force on upper surface 308 of piston 306. This downward force is opposed by an oppositely acting upward force due to spring 328 acting on lower surface 322 of piston 306. However, due to the remoteness of valve 40 relative to valve 16, a substantial delay is experienced in communicating the first impulse to valve 40.

Under the above-described conditions, transducer 42 connected to conduit 22 adjacent valve 16, senses a pressure that is relatively higher than the pressure sensed by transducer 50 connected to conduit 48 adjacent valve 40. Thus transducer 42 and 50 produce signals proportional to their respective pressures sensed. The signal from transducer 42 is communicated to logic means 46 via electrical connection 44 while the signal from transducer 50 is communicated to logic means 46 via electrical connector 52. The signal from transducer 42 to logic means 46 is transmitted much faster than the first impulse can be communicated to valve 40 via conduit 22.

With the logic means 46 provided as hereinabove set forth a 1 signal is sent from logic means 46 to solenoid 136 of valve 40 and a 0 signal is sent to solenoid 134. The signal sent to solenoid 136 actuates this normally closed solenoid and opens a second passageway comprising passages 132, 128 into opening 125 and futher into passage 120 to admit a second impulse of fluid pressure from second reservoir 36 to upper chamber portion 508 to communicate with and cause a second downward force on upper surface 308 of piston 306. This second downward force precedes the first force resulting from the first impulse to act on piston 306. Since the tractor-trailer fluid pressure systems are interconnected via conduit 38, the first and second impulses can equalize.

Fluid pressure from second reservoir 36 is in constant communciation with inlet port 216 of valve 40. This fluid pressure is normally precluded from communication with the lower surface 322 of piston 306 in lower chamber 510 due to sealing member 262 and seating portion 222 being urged into sealing engagement by spring 268. The second downward force is opposed by the force exerted by spring 328 and since lower chamber 510 is in open fluid communication with the atmosphere via exhaust port 219, piston 306 is forced downwardly so that annular seat 326 of piston 306 engages sealing portion 262 of piston 250 to interrupt fluid communication between lower chamber 510 and exhaust port 219 and open fluid communication between lower chamber 510 and second container 36 whereby a third impulse of fluid pressure at inlet 216 is admitted into lower chamber 510. This third impulse can equalize with the first and second impulses due to the interconnection of reservoirs 18 and 36. This immediately causes an upward force applied to lower piston surface 322 sufficient to drive piston 306 upward in chamber 506 since fluid pressures acting on opposite sides of piston 306 are substantially equal and the fluid force on lower surface 322 is aided by the upward force exerted by spring 328. When the third impulse of fluid pressure is admitted into lower chamber 510 this causes the third impulse of fluid pressure to be almost immediately communicated to the trailer brakes via recess 210, outlet 212 and fluid conduit 48. As a result a sudden pressure rise is sensed in conduit 48 by transducer 50 which transmits a proportional signal to logic means 46 via line 52.

The holding mode of this system follows the initial application mode whereby the vehicle operator can forseeably hold downward pressure on pedal 64 of application valve 16 and the third impulse of fluid pressure has been communicated to the trailer brakes. The pressure rise sensed by transducer 50 can increase to a pressure substantially equal to the pressure sensed by transducer 42. At this point it can be appreciated that, in view of the foregoing description of first logic means 46, when pressure sensed by transducer 50 is at least as high as the pressure sensed by transducer 42, a 0 signal is produced from the first logic means and sent to second solenoid 136 along line 60 and a 0 signal is sent to first solenoid 134 along line 62. A 0 signal to the second solenoid causes that solenoid to return to its normally closed position thus interrupting communication of the second impulse from reservoir 36 to upper chamber 508. However, upper chamber 508 remains in fluid communication with conduit 22 in which the first impulse was generated. Thus, the first impulse provides substantially the same pressure in upper chamber 508 as was provided by the second impulse. Fluid pressure chambers 508, 510 being exposed to substantially equal pressure, piston 306 is provided to position itself within chamber 506 so that both seating areas 326, 222 are in sealing engagement with sealing portion 262 thus interrupting fluid communication between lower chamber 510 and inlet 216 and between chamber 510 and exhaust passage 219. Thus, the third impulse of fluid pressure remains isolated between lower chamber 510 and the rear trailer brake actuators. In this manner, the pressures sensed at transducers 42, 50 remain substantially equal.

The release mode of this system generally follows the holding mode wherein, as hereinbefore discussed, pressures sensed at transducers 42 and 50 are substantially equal. The release mode is caused by removal of foot pressure from pedal 64 by the vehicle operator. Such removal of foot pressure at valve 16 cuts off or interrupts the first impulse of fluid pressure being supplied from first reservoir 18 to relay valve 40 via conduit 22. Thus, transducer 42 immediately senses a pressure drop and sends a proportional signal to first logic means 46. At this point therefore, transducer 50 is sensing pressure higher than the pressure sensed by transducer 42 and is sending a signal proportional thereto to first logic means 46 via line 52. Therefore, it can be appreciated that in view of the foregoing description of logic means 46, when pressure sensed by transducer 50 is higher than pressure sensed by transducer 42, a 0 signal is produced from the first logic means and sent to second solenoid 136 along line 60 and a 1 signal is sent to first solenoid 134 along line 62. A 1 signal to first solenoid 134 actuates that solenoid from its normally open position permitting fluid communication between conduit 22 and upper chamber 508 via the first passageway to a closed position whereby sealing surface 146b seats against seating area 123a to interrupt fluid communication in the first passageway particularly between passage 126 and opening 123. As a result, fluid pressure in upper chamber 508 is permitted to exhaust back through passage 118 into opening 123 and then through passage 164, exhaust passage 158 and ultimately to atmosphere through unsealed solonoid chamber 101. Any excess pressure remaining in passage 126 and 130 is exhausted back through port 72 and conduit 22. Further exhausting of chamber 508 is accomplished due to a pressure drop in chamber 508 which permits relatively higher pressure in lower chamber 510 to force piston 306 upwardly. Thus, seating area 326 is urged out of sealing engagement with sealing portion 262 which permits pressure in conduit 48 to exhaust through outlet 212, recess 210, chamber 510 and ultimately to atmosphere via exhaust port 219.

The foregoing generally describes operational characteristics of similarly known fluid pressure relay brake systems although the above-described system includes a relay valve 40 and logic means 46 having novel provisions incorporated therein.

With the advent of skid control systems, the known fluid pressure relay brake systems were found to be incompatible therewith. The novel relay valve 40 of this invention functions with the fluid relay brake systems to give similar results to those given in known systems during the normal application, holding and release modes, but due to the novel provisions of the valve and first logic means 46, compatibility between the fluid relay system and skid control systems is achieved.

Thus, during the application mode, as hereinabove set forth, pressure sensed at transducer 42 is greater than pressure sensed at transducer 50 and proportional signals are sent by the transducers to first logic means 46. With the logic means 46 provided as stated above, it can be appreciated that nor gate 470 receives a 0 signal from and gate 460 via lines 464, 468. That 0 signal is converted to a 1 signal. Thus, a 1 signal is produced at and gate 474 and solenoid 136 is actuated to ultimately permit valve 40 to communicate fluid pressure from reservoir 36 to the rear trailer brakes while a 0 signal is produced at and gate 486 so that normally open solenoid 134 remains open to permit fluid communication between reservoir 18 and piston 306 of valve 40. However, should an impending skid condition exist, skid control logic means 54 sends a 1 signal to nor gate 470 via line 56 and also a 1 signal is sent directly to first solenoid 134 via line 58 to line 62. As earlier described, nor gate 470 having received multiple signals any of which is a 1 signal, then a 0 signal is produced. Thus, the result is that a 0 signal is produced at and gate 474 to deactivate the actuated solenoid 136 so as to omit fluid pressure communication from reservoir 36 to the rear trailer brakes. Also, a 1 signal is sent directly to normally open solenoid 134 via lines 58 and 62 so that solenoid 134 is actuated to close thus omitting fluid communciation between reservoir 18 and piston 306 of valve 40. Thus, the novel provisions of the interconnection of logic means 46 and 54 and the novel provisions of relay valve 40 provide a simulated release mode in the fluid pressure relay system even through foot pressure is still being applied to pedal 64. If, however, no impending skid conditions exist, it can be seen that interconnection of logic means 46 and 54, when logic means 54 is producing 0 signal, has no effect on the normal functioning of the relay system.

During the holding mode, as hereinbefore set forth, pressure sensed at transducers 42 and 50 are substantially equal and proportional signals are sent by the transducers to first logic means 46. With logic means 46 provided as stated above, it can be appreciated that nor gate 470 receives a 1 signal from and gate 460 via lines 464, 468. That 1 signal is converted into a 0 signal. Thus, a 0 signal is produced at and gate 474 and solenoid 136 is deactuated to ultimately limit valve 40 to further communicate fluid pressure from reservoir 36 to the rear trailer brakes while a 0 signal is produced at and gate 486 so that normally open solenoid 134 remains open to permit fluid communication between reservoir 18 and piston 306 of valve 40. However, should an impending skid condition exist, skid control logic means 54 sends a 1 signal to nor gate 470 via line 56 and also a 1 signal is sent directly to first solenoid 134 via line 58 to line 62. As earlier described, nor gate 470 having received multiple signals any of which is a 1 signal, then a 0 signal is produced. Thus, the result is that a 0 signal is produced at and gate 474 as before so as to have no effect on solenoid 136 and omit fluid pressure communication from reservoir 36 to the rear trailer brakes. Also, a 1 signal is sent directly to normally open solenoid 134 via lines 58 and 62 so that solenoid 134 is actuated to close thus omitting fluid communication between reservoir 18 and piston 306 of valve 40. Thus, the novel provisions of the interconnection of logic means 46 and 54 and the novel provisions of relay valve 40 provide a simulated release mode in the fluid pressure relay system even though foot pressure is still being applied to pedal 64. If, however, no impending skid conditions exist, it can be seen that interconnection of logic means 46 and 54, when logic means 54 is producing 0 signal, has no effect on the normal functioning of the relay system.

Obviously, during the release mode, no impending skid conditions are sensed inasmuch as the release mode is the mode during which there is no braking action occurring at application valve 16.

With logic means 46 provided as hereinabove described the minus (—) 0.25 mv constant signal input at comparator 454 and a similar signal input at comparator 442 can alter the signal received from adders 420, 408, respectively. Also nor gates 470, 482 can alter the signals they receive and send on to and gates 474, 486, respectively. As a result, the potential simultaneous actuation of both solenoids is precluded.

The foregoing has described a system and a valve for use therein to make that system compatible with skid control systems in tractor-trailer combinations. It is anticipated that modifications and variations of the present invention are possible in the light of the above teachings. It is, therefore, to be understood that within the scope of the appended claims the invention may be practiced otherwise than as specifically described.

I claim:

1. A relay valve for use in an air brake system wherein brake actuators are operated by fluid pressure, the valve comprising:
   first port means in the valve for receiving a first impulse of fluid pressure from a first source;
   second port means in the valve for receiving a second impulse of fluid pressure from a second source;
   first solenoid means normally opening the first port for permitting the first impulse of pressure to enter the valve; and
   second solenoid means normally closing the second port and operably connected for permitting the second impulse of pressure to enter the valve simultaneously with the first impulse.

2. A relay valve for use in an air brake system wherein brake actuators are operated by fluid pressure, the valve comprising:
   first passage means formed in the valve for permitting a first impulse of fluid pressure to enter the valve;
   means in the first passage means normally opening the first passage and operable under preselected conditions to close the first passage;
   second passage means formed in the valve; and
   means in the second passage means normally closing the second passage and operable under preselected conditions to open the second passage for permitting a second impulse of fluid pressure to enter the valve simultaneously with the first impulse.

3. The relay valve of claim 2, wherein:
   the first passage means including exhaust means for exhausting fluid pressure to atmosphere.

4. The relay valve of claim 3, wherein:
   the means in the first and second passage means, respectively, each comprise a solenoid.

5. A relay valve for use in an air brake system wherein brake actuators are operated by fluid pressure, the valve comprising:
   a piston chamber formed in the valve;
   piston means operable for reciprocating in the chamber in response to fluid pressure acting thereon;
   first passage means formed in the valve for permitting a first impulse of fluid pressure to enter the valve and communicate with the piston;
   closure means reciprocable in the first passage means normally opening the first passage and operable under preselected conditions to close the first passage for interrupting fluid pressure communication with the piston;
   second passage means formed in the valve; and
   closure means reciprocable in the second passage means normally closing the second passage and operable under preselected conditions to open the second passage for permitting a second impulse of fluid pressure to enter the valve and communicate with the piston simultaneously with the first impulse.

* * * * *